April 16, 1946.　　　C. C. WANG　　　2,398,606
U.H.F. POWER MEASUREMENT
Filed March 27, 1943
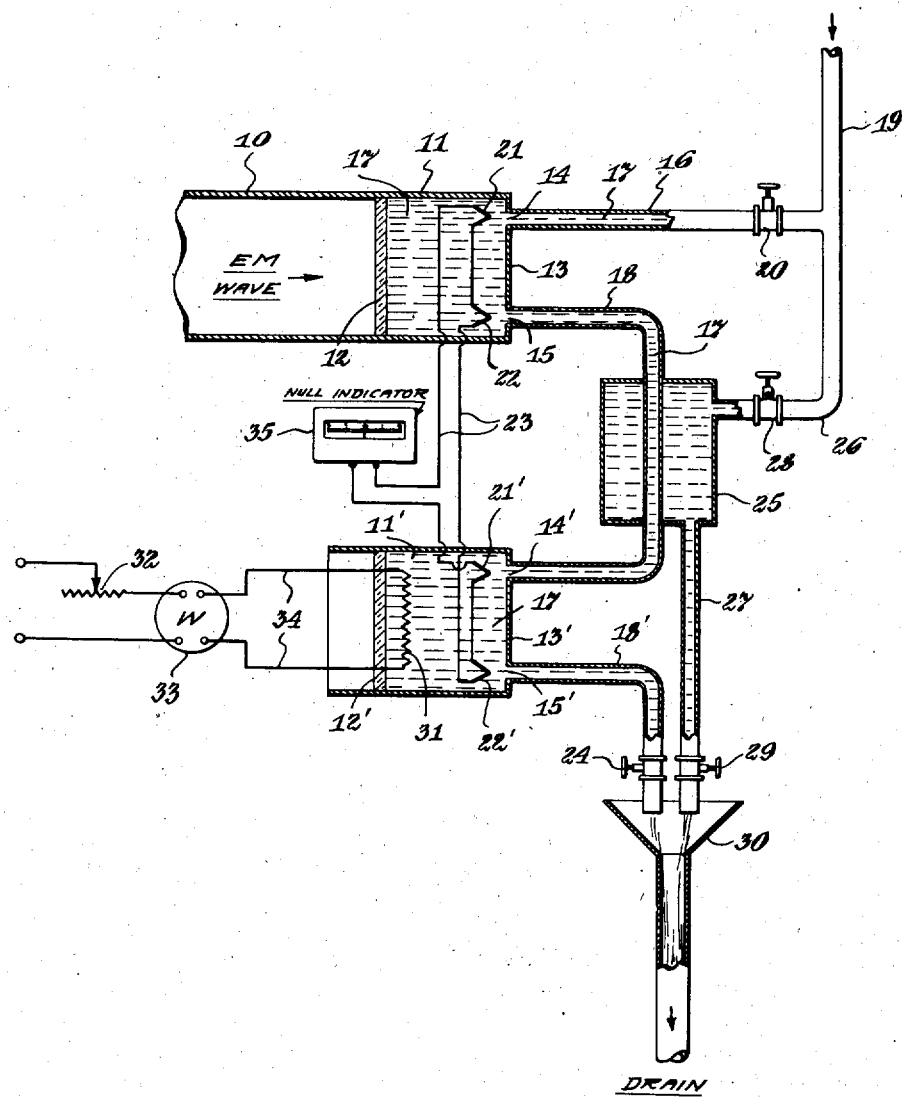
INVENTOR
C. C. WANG.
BY (signature)
ATTORNEY Patented Apr. 16, 1946

2,398,606

UNITED STATES PATENT OFFICE 2,398,606

ULTRA HIGH FREQUENCY POWER MEASUREMENT

Chao C. Wang, Montclair, N. J., assignor to Westinghouse Electric Corporation, East Pittsburgh, Pa., a corporation of Pennsylvania Application March 27, 1943, Serial No. 480,883

9 Claims. (Cl. 171—95)

This invention relates to U. H. F. power measurement and more particularly to power measurement based on the principle of voltage developed by a thermo couple.

A common practice employed prior to the present invention has been to measure power of ultra high frequency, and especially micro-wave energy, generated by a source of such energy, by absorbing the energy in a volume of water flowing through a chamber for the purpose. By measuring certain factors, the power can be computed from the factors ascertained or known. The general procedure has been to keep a steady flow of water running to and from the chamber and to assume the specific heat and water density are constants. Designating the heat dissipated per unit time in the water of the chamber as W, the in-flow temperature of the water as $T_1$, and the out-flow temperature $T_2$ and designating the flow in units of volume velocity by V, the specific heat constant as C and the density of the water as $\rho$, the general formula expressing the inherent relationship is: $W \infty (T_2-T_1) V \rho C$. But it will be observed that all of these factors involve probable errors of measurement, as the absolute value of each is difficult to ascertain or varies from time to time, and thus the resultant measurement can never be made very reliable under the prior art practice. As calibration of the thermo couple depends upon determination of temperature differences it will be obvious a double error is possible and accuracy thereby diminished. The potential evolved is of very small order, and this necessitates use of an exceedingly delicate and expensive millivolt meter. The volume-velocity of the water or other fluid medium employed is measured by a cylinder graduated in length and time visually with a stop-watch or the like which again injects possibility of double error. This will be more apparent when remembering that the surface tension or capillarity of the water concaves its upper surface and that waterdrops will adhere to the glass cylinder where the water is being measured. Timing by a watch can be accurate only to a fifth of a second, thereby necessitating at least half a minute time to make even a reasonably accurate reading.

Again, as the property of hydrant water used will vary from day to day due to temperature variation, purity and other factors, errors are introduced in assuming specific heat C and the density C of the water as constants. Further error is introduced by heat loss of the water through the tubing. Other disadvantages exist, of which may be mentioned the nuisance of keeping the same rate of flow during the time of taking the reading, the difficulty of reading instantaneous power dissipation, and complications of controlling and watching several instrumentalities simultaneously.

Finally, with respect to the prior art practice it must be borne in mind that a final probable error is considered mathematically as the square root of the sum of the squares of the individual probable errors, and that the prior art power measuring apparatus, as indicated above, involves numerous individual probable errors the sum of the squares of which becomes quite large.

The present invention provides a structure overcoming the above disadvantages and probable errors, as its primary desideratum.

A general purpose of the invention may accordingly be stated as directed to more accurate and less cumbersome measurement of microwave power.

More specifically, an object of the invention is to eliminate as far as possible the human element of control and reading.

Another object of the invention is to enable accurate instantaneous readings to be made.

A further object of the invention is to enable power readings to be made directly in watts, without need of calculation from other readings and factors.

Yet another object of the invention is to avoid necessity of and large errors introduced by reading of the minute millivolt potential produced by the thermal couple.

Still further objects of the invention will appear as the description progresses, both by direct recitation thereof and by implication from the context.

In the accompanying drawing wherein is disclosed a preferred embodiment of the invention, the figure illustrating the same is a structural sectional and schematic view of general assembly of an ultra high frequency measuring apparatus and system in accordance with my inventive concept.

Referring to said drawing, reference numeral 10 designates a wave guide of definite cross-section, and usually rectangular, within which wave energy is promulgated in desired mode longitudinally thereof. The wave guide 10, for purposes of measuring the power of wave energy, is terminated by a chamber 11 of equal cross-sectional area to the body of the wave guide. The electric energy or power to be measured, and indicated in the wave guide as an EM wave, recognized in the art as designating electro-magnetic wave energy, moves in the wave guide toward the said chamber. This chamber is divided from the body of the wave guide by a water-tight wall or partition 12 transparent to the wave energy. Glass has been indicated as one material suitable for the purpose. This represents one typical arrangement. The invention is applicable, however, to any other U. H. F. power measurement apparatus in which energy to be measured is dissipated in an enclosed water chamber.

End wall 13 for the chamber 11 is shown with an inlet opening 14 near its top and an outlet opening 15 near its bottom. An inlet pipe 16 is in direct communication with inlet opening 14 to supply a flow of water or other suitable fluid 17 to the chamber. An outlet pipe 18 is in direct communication with outlet opening 15 for the effluent from the chamber. Water or other fluid is supplied from a main supply pipe 19 to the inlet pipe 16, the flow being under control of a suitable valve 20 in the inlet pipe.

A thermocouple is provided within said chamber 11, it being illustrated as providing one electro-thermal element 21 next the inlet opening 14 and another electro-thermal element 22 next the outlet opening 15. These two electro-thermal elements are electrically insulated from the fluid and are connected in electrical series by appropriate insulated wiring 23 which passes to the exterior of the chamber. In practical construction these are thermopiles with junctions located in proximity to the entrance of pipe 17 and 18 respectively. The distance between the junction and the opening of chamber is kept small. The wave energy promulgated in the wave guide is absorbed in the fluid in the chamber and thereby converted to heat, as a result of which the fluid temperature difference next the inlet and next the outlet with definite flow is proportional to the wave energy absorbed. This difference in temperature produces a voltage difference in the electro-thermal elements, which, in the prior art was measured on a delicate millivolt meter connected across the wires 23 outside the chamber. This minute potential and delicacy of reading made accuracy of result most difficult in the prior art.

According to the present invention, I provide a twin chamber 11' having size, shape, and capacity duplicating chamber 11 above described. This twin chamber 11' has opposite end walls 12' and 13' of material corresponding to like walls for the wave-guide chamber and otherwise constructed to be subject to heat radiation preferably precisely equal to that of the wave-guide chamber. Inlet and outlet openings 14' and 15' next the top and bottom of end wall 13' are provided and have a size and relative location the same as in the wave-guide chamber. Outlet pipe 18 from the wave-guide chamber leads to and constitutes inlet connection for inlet opening 14' and an outlet pipe connection 18' is connected at and leads from outlet opening 15'. The same fluid and identical volume and velocity flow is therefore obtained in both chambers. A valve 24 may be provided on the outlet pipe 18' if desired, to prevent the chambers from emptying when shutting down the apparatus. If the wave guide 11 is designed such that the heat lost or gained from surrounding or from the connected wave guide is negligible, then this twin chamber 11' can be designed in most convenient shape with negligible heat interchange to the surroundings, and thus the apparatus can be used as a universal measuring instrument for measuring U. H. F. power in any apparatus with the qualification given.

Water or fluid 17 passing from outlet 15 of the wave-guide chamber 11 to the inlet opening 14' of the twin chamber is conducted through a cooling system to introduce the water or fluid into each chamber 11 and 11' at substantially equal temperatures. In order to accomplish this desideratum, pipe 18 passes through a cooling tank 25 within which is a flow of water from the same source supplying water to the chambers. As shown, a branch pipe 26 from main supply pipe 19 enters said tank 25 near its top and a discharge pipe 27 is shown leading from the bottom of the tank. Valves 28, 29 in this branch pipe 26 and discharge pipe 27 control the flow and discharge of the water to and from the tank. Heat transfer from the water in the connecting pipe 18 between chambers will thus be governed by the same temperature of water supplying that pipe by being surrounded by water from the same source. This is only necessary when the temperature difference developed across the thermocouple is large and thermo E. M. F. becomes a non-linear function of temperature difference. By proper choice of thermo-couple material used and rate of flow, this cooling system can be eliminated.

While I have shown the outlet pipe 18' of the twin chamber and the cooling tank discharge pipe 27 opening into a funnel drain 30, it is to be understood this is illustrative only, and it is within the scope of the invention to utilize a closed circuit of water supply, in which event said discharge pipes would be part of the water-return system to a supply reservoir feeding both the chambers and cooling tank. Furthermore the cooling tank shown is to be understood as exemplary of any desired cooling system for equalizing temperature at the twin chamber inlet 14' to the temperature at the wave-guide chamber inlet 14.

Twin chamber 11' is provided with a heater 31 next partition or end wall 12' for introducing heat in that chamber. The heat is electrically insulated from the water and walls of the chamber in any approved manner, and is preferably activated by an electric current under control of a suitable resistance or rheostat 32. A watt-meter 33 is included in the circuit 34 between the rheostat and heater for obtaining direct reading of power input applied to the heater.

Within twin chamber 11' is a thermocouple duplicating the thermocouple in wave-guide chamber 11. This second thermocouple accordingly is constituted by one thermopile or electro-thermal element 21' next the inlet opening 14' and another thermopile or electro-thermal element 22' next the outlet opening 15'. These two thermopiles or electro-thermal elements are electrically insulated from the fluid and are connected in series so that the difference in temperature of the water at the inlet and at the outlet will produce a potential difference. When the difference in temperature between water or fluid at the inlet 14' and outlet 15' of the twin chamber 11' is identical with the difference in temperature between water at the inlet 14 and outlet 15 of the wave-guide chamber 11, the potential differences produced in the respective thermocouples in said chambers will be equal. The wiring between the two thermocouples of the two chambers is such that potentials produced will be opposed to each other, and thus when the potentials are equal, one will cancel or nullify the other. This is a desirable and specific case of ratio of the potentials in two identical thermocouples requiring no correction factor. A null-indicator 35 is placed in the circuit between the two thermocouples to indicate the degree of nullification. In case the two pairs of thermocouples are not exactly identical, then a calibration for a correction factor can be made, that the null point indicates a predetermined definite ratio of power dissipated in chambers 11 and 11'.

In operation, power of ultra high frequency wave energy in the wave guide 10 enters the wave-guide chamber 11 and is transformed to heat, thereby raising the temperature of the water of fluid 17 in that chamber, and, by virtue of the temperature difference at inlet 14 and outlet 15 thereof establishes a potential difference in the thermocouple circuit 23. This potential difference tends to swing the null indicator 35 from zero position. The operator applies a heating current through rheostat 32, watt meter 33 and circuit 34 to heat the water 17 in the twin chamber 11' until potential difference in the thermocouple in that chamber has the desired ratio with the potential difference of the wave-guide thermocouple. This ratio, which is preferably equality of potentials, is visualized by swing of the null indicator 35 back to the null or zero position which, in the specific case of identity of the thermocouples gives the ratio of potentials as unity without a correction factor. Regulation of the current to the heater to maintain the null indicator at the zero position is then the simple concern of the operator, and while that condition prevails a reading from the watt meter 33 gives direct reading of power supplied to the twin chamber 11' and that will be the reading for power functioning in the wave-guide 10 since both, in the preferred case, are producing identical and nullifying potentials in their respective thermocouples. The arrangement entirely eliminates any assumptions as to specific heat or density of the water and avoids all necessity for reading of time, heat loss or flow volume. The wattage is of sufficiently high value that the possible error of reading is negligible and thus the measurement of power is accurately, speedily and readily obtained.

While the apparatus illustrated is exemplary of one embodiment and in some respects diagrammatic, it is to be understood that appropriate substitutions and refinements of structure may be incorporated without departing from the spirit or scope of the invention either as described heretofore or as claimed hereinafter.

I claim:

1. Power measuring apparatus comprising a pair of fluid chambers, means applying electric power sought to be measured to the fluid of one chamber, means applying a known electric power to the fluid of the other chamber, the power to the respective chambers being converted to heat in the fluid of the said chambers, means for indicating state of equality of heat developed in the fluid of the two chambers, and means for varying the known power to establish equality of heat developed in the two chambers.

2. Power measuring apparatus comprising a pair of fluid chambers, means applying electric power sought to be measured to the fluid of one chamber, means applying a second electric power to the fluid of the second chamber, the power to the respective chambers being converted to heat in the fluid of the said chambers, means for indicating state of equality or definite ratio of heat developed in the fluid of the two chambers, means for varying the power converted to heat in the second chamber and establishing equality or definite ratio of heat developed in the two chambers, and means for directly indicating the value of the second power as the equivalent of power sought to be measured at the condition of equality of heat developed in the two said chambers.

3. Power measuring apparatus for ultra high frequency electro-magnetic wave energy comprising a wave guide terminating in a fluid chamber, a second fluid chamber having electrical heating means, a variable source of electrical heating energy and meter for said electrical heating means, a connection between said chambers for passage of fluid from one to the other, means for equalizing temperature of fluid entering each chamber, and means for indicating effects of temperature differences between inflowing and outflowing fluid for both chambers.

4. Power measuring apparatus for ultra high frequency electro-magnetic wave energy comprising a wave-guide terminating in a fluid chamber, a second fluid chamber of equal dimensions to the wave-guide chamber, each said chamber having a fluid inlet and a fluid outlet, a flow connection between the outlet of one chamber to the inlet of the other, means for equalizing the temperature of fluid entering at the inlet of each chamber, a thermocouple in each chamber and each having an electro-thermal element next an inlet and an electro-thermal element next an outlet whereby each thermocouple produces a potential, a null indicator, means connecting one thermocouple to the null indicator in opposition to the other thermocouple whereby the null indicator will indicate equal or definite ratio of and opposite potentials in the thermocouples, means for heating the fluid of the second fluid chamber to equality or definite ratio with heating of the fluid in the wave-guide chamber and thereby cause the null indicator to give a zero reading, and means for measuring power applied to heat the fluid of the second chamber to the aforementioned equality or definite ratio indicated by the null indicator.

5. A method of measuring ultra high frequency electro-magnetic wave energy comprising heating a flow volume of fluid by said energy, heating a like flow volume of fluid by a second source of electric power, indicating the state of equality or definite ratio of heating of both flow volumes, and measuring the second source of power.

6. A method of measuring ultra high frequency electro-magnetic wave energy comprising heating a flow volume of fluid between an inlet and an outlet by the said wave energy, cooling the outflowing fluid from said chamber to the temperature of the inflowing fluid, conducting the cooled fluid to a second inlet to pass to a second outlet, electrically reheating the fluid between the second inlet and outlet to equality of heating first performed, and measuring the electric power required to effect the said reheating of the fluid.

7. Electric power measuring apparatus comprising a pair of fluid chambers, means for maintaining equal flow of fluid in both chambers, means for indicating ratio of temperature difference or equality of temperature between inflow and outflow of fluid in the two chambers, means for equalizing change of temperature of the fluid in one chamber to that of the other chamber, and means for measuring heating energy applied in effecting equalization of the temperatures of the fluid in the two chambers.

8. Electric power measuring apparatus comprising a pair of fluid chambers, means for maintaining equal flow of fluid in both chambers, means for equalizing inflow temperature of fluid to both chambers, means for indicating ratio of temperature difference or equality of temperature between inflow and outflow of fluid in the two chambers, means for equalizing change of temperature of the fluid in one chamber to change of temperature of the fluid in the other chamber, and means for measuring heating energy applied in effecting equalization of the temperatures of the fluid in the two chambers.

9. Electric power measuring apparatus comprising a pair of fluid chambers, means for applying electical energy to be measured to the fluid in one of said chambers, means for maintaining equal flow of fluid in both chambers, a thermocouple in each chamber, a null indicator wired to both thermocouples for indicating temperature change between inflow and outflow of fluid in the two chambers, means for applying electrical heating energy to the fluid in the second one of said chambers for equalizing temperature change of the fluid therein between inflow and outflow to the temperature change in the fluid in the first said one of said chambers, and an electrical meter for measuring the applied electrical heating energy to the second one of said chambers in effecting the temperature equalization.

CHAO C. WANG.